United States Patent
Kanj et al.

(10) Patent No.: US 12,139,064 B2
(45) Date of Patent: Nov. 12, 2024

(54) METHOD FOR ADAPTING SETPOINTS FOR A DIGITAL LIGHTING UNIT OF A MOTOR VEHICLE PRELIMINARY CLASS

(71) Applicant: VALEO VISION, Bobigny (FR)

(72) Inventors: Ali Kanj, Bobigny (FR); Constantin Prat, Bobigny (FR); Yasser Almehio, Bobigny (FR); Hafid El Idrissi, Bobigny (FR)

(73) Assignee: VALEO VISION, Bobigny (FR)

( * ) Notice: Subject to any disclaimer, the term of this patent is extended or adjusted under 35 U.S.C. 154(b) by 192 days.

(21) Appl. No.: 17/766,349

(22) PCT Filed: Sep. 30, 2020

(86) PCT No.: PCT/EP2020/077293
§ 371 (c)(1),
(2) Date: Apr. 4, 2022

(87) PCT Pub. No.: WO2021/063982
PCT Pub. Date: Apr. 8, 2021

(65) Prior Publication Data
US 2023/0311743 A1    Oct. 5, 2023

(30) Foreign Application Priority Data
Oct. 4, 2019 (FR) ...................... 1911049

(51) Int. Cl.
*B60Q 1/14* (2006.01)
*H04N 9/31* (2006.01)

(52) U.S. Cl.
CPC ......... *B60Q 1/1407* (2013.01); *H04N 9/3138* (2013.01); *H04N 9/3155* (2013.01); *H04N 9/3185* (2013.01)

(58) Field of Classification Search
CPC .......... B60Q 1/14; B60Q 1/115; B60Q 1/122; B60Q 1/1407; B60Q 1/1415;
(Continued)

(56) References Cited

U.S. PATENT DOCUMENTS

| 6,456,340 B1 | 9/2002 | Margulis | |
| 2009/0180171 A1* | 7/2009 | Ichikawa | G03B 21/008 359/290 |

(Continued)

FOREIGN PATENT DOCUMENTS

| CN | 106662310 A | 5/2017 |
| CN | 109668115 A | 4/2019 |

(Continued)

OTHER PUBLICATIONS

Office Action issued Jun. 2, 2023, in corresponding Japanese Patent Application No. 2022-520625 (with Partial English Translation), 11 pages.

(Continued)

*Primary Examiner* — Sultan Chowdhury
(74) *Attorney, Agent, or Firm* — Oblon, McClelland, Maier & Neustadt, L.L.P.

(57) ABSTRACT

A method for adapting a setpoint for a digital lighting unit, which is intended to be projected by a digital lighting unit of a motor vehicle, which includes a matrix light source and an optical system. The method includes a step of applying digital filtering to the digital setpoint. The filter used is capable of anticipating geometric aberrations induced by said optical system when projecting a digital setpoint.

19 Claims, 2 Drawing Sheets

(58) Field of Classification Search
CPC .. H04N 9/3138; H04N 9/3152; H04N 9/3155; H04N 9/3164; H04N 9/3182; H04N 9/3185; H04N 9/3188; G03B 21/142; G03B 21/147; G03B 21/208; G03B 21/2006; G03B 21/2013; G03B 21/2033; G03B 21/2053

See application file for complete search history.

(56) References Cited

U.S. PATENT DOCUMENTS

| | | | | |
|---|---|---|---|---|
| 2011/0141439 | A1* | 6/2011 | Yamauchi | G03B 21/208 353/38 |
| 2016/0073000 | A1* | 3/2016 | Abelé | F21S 41/675 348/148 |
| 2019/0116345 | A1 | 4/2019 | Albou et al. | |
| 2019/0264885 | A1 | 8/2019 | Lefaudeux et al. | |
| 2021/0278057 | A1* | 9/2021 | Hayami | B60Q 1/1407 |

FOREIGN PATENT DOCUMENTS

| | | |
|---|---|---|
| JP | 2017-521298 A | 8/2017 |
| JP | 2019-142474 A | 8/2019 |

OTHER PUBLICATIONS

International Search Report issued on Dec. 18, 2020 in PCT/EP2020/077293 filed on Sep. 30. 2020, 3 pages.

Brown et al., "Image Pre-conditioning for Out-of-Focus Projector Blur", Conference On Computer Vision and Pattern Recognition, 2006 IEEE Computer Society, New York, NY, USA Jun. 17-22, 2006, Piscataway, NJ, USA vol. 2, 2006, 8 pages.

Office Action issued Jun. 27, 2024, in Chinese Patent Application No. 202080070192.7 filed Sep. 30, 2020, (with English translation), 13 pages.

* cited by examiner

METHOD FOR ADAPTING SETPOINTS FOR A DIGITAL LIGHTING UNIT OF A MOTOR VEHICLE PRELIMINARY CLASS

The invention relates to lighting modules for motor vehicles. In particular, the invention relates to control methods for such modules involving matrix light sources.

A light-emitting diode (LED) is a semiconductor electronic component capable of emitting light when it is subjected to an electric current having at least one threshold intensity. In the automotive field, LED technology is increasingly being used for numerous light signaling solutions. LED matrices are of particular interest in the field of automotive lighting. Matrix light sources may be used for "leveling"-type functions, i.e. adjusting the height of the emitted light beam according to the attitude of the vehicle and the profile of the road. Other applications include DBL ("digital bending light") which corresponds to adjusting the direction of the emitted light beam in order to follow the road in the horizontal plane, ADB ("adaptive driving beam") which corresponds to an anti-dazzle function that generates shaded areas in the light beam emitted by a high beam so as not to disrupt other road users, but also functions for projecting patterns on the ground using the pixelated light beam. The contours of the shaded areas must be well defined and reproducible by a lighting device in order to comply with regulations in force.

It is known practice to use light sources with different types of technology for the aforementioned lighting applications. This may include, for example, monolithic technology, according to which a large plurality of LED-type elementary sources, equivalent to pixels, are etched into a common semiconductor substrate. Integrated electrical connections allow the pixels to be activated independently of one another. Another known technology is that of microLEDs, which produces a matrix of LEDs of small size, typically smaller than 150 µm. There are also modules of micromirror, or DMD ("digital micromirror device"), type, which involve a projection technology using an intensity modulator on a uniform beam. Micromirrors, the position of which is controlled by way of piezoelectric elements, are oriented so as to selectively reflect an incident light beam, so that each micromirror corresponds to an elementary source of the pixel matrix thus produced. The light from a source is directed onto the matrix of micromirrors by an optic.

The light emitted by a matrix light source passes through an optic comprising at least one optical lens, so as to project the desired contour in front of the motor vehicle. However, for a given matrix light source and an associated output optical system, the response of the elementary light sources of the matrix through the optical system is not homogeneous. Typically, a central region is able to project at a high resolution, while the resolution decreases progressively toward the edges of the field of view of the light source, which may equally have a large aperture of the order of 35°. The projection of precise contours in regions of lower resolution (i.e. at the edges of the field of view) is therefore difficult or even impossible using known solutions. The result of the projection of a precise contour or pattern in such a region is generally a blurred or significantly distorted contour or pattern.

One aim of the invention is to overcome at least one of the problems posed by the prior art. In particular, the invention aims to propose a method that is able to increase the precision of patterns or contours projected by way of a matrix light source and an associated optical system, without however using a more complex or expensive optical system.

According to a first aspect of the invention, what is proposed is a method for adapting a digital lighting setpoint intended to be projected by a digital lighting unit of a motor vehicle. The lighting unit comprises a matrix light source and an optical system. The method is noteworthy in that it comprises a step of applying, by way of a computing unit, digital filtering to the digital setpoint before relaying the filtered digital setpoint to the lighting unit. The digital filtering anticipates geometric aberrations induced by said optical system during the projection of a digital setpoint.

Preferably, the digital lighting setpoint may comprise an elementary light intensity setpoint for each elementary light source of the matrix light source. The digital filtering may preferably comprise selectively reducing the elementary light intensity setpoints in accordance with predetermined elementary setpoint filtering values.

Preferably, said filtering may comprise applying a dedicated digital filter for each of the elementary light setpoints, said dedicated digital filter anticipating the geometric aberrations induced by said optical system on the projected pixels that form part of a spatial neighborhood of the projected pixel corresponding to said elementary light setpoint.

The neighborhood of a pixel may, for example, cover a predetermined number of pixels surrounding this pixel. As an alternative, it may cover all of the pixels within a circle of predetermined radius.

Preferably, said filtering may comprise applying a dedicated digital filter for each column or row of elementary light setpoints, said dedicated digital filter anticipating the geometric aberrations induced by said optical system on the projected columns or rows of pixels that form part of the spatial neighborhood of the projected column or row of pixels corresponding to said column or row of elementary light setpoints.

The lighting setpoint may preferably comprise a digital image having a resolution at least equal to the projection resolution of the lighting device.

Preferably, the method may comprise the following preliminary steps for each elementary light source of the matrix light source:

i) determining the spatial light distribution of the pixel projected through the optical system when the elementary light source is controlled so as to emit at a maximum output;

ii) determining, by way of a computer, a reduction factor or value of the maximum output, such that the reduced emission output produces a spatial light distribution that illuminates the pixels in the neighborhood of the projected pixel at most to a predetermined degree of brightness;

iii) associating the reduction factor or value with the position of said light source in the matrix light source, and storing it in a memory element as elementary setpoint filtering value for a corresponding elementary setpoint.

Preliminary steps i)-iii) may preferably be performed once for each row or column of elementary light sources.

According to another aspect of the invention, what is proposed is a lighting device for a motor vehicle. The lighting device comprises a digital lighting unit having a matrix light source composed of elementary light sources as well as an optical system. The device furthermore comprises a data reception unit intended to receive a lighting setpoint. The lighting device is noteworthy in that it comprises a computing unit configured so as to adapt a received lighting setpoint in accordance with a method according to one aspect of the invention. The lighting device furthermore comprises a control unit intended to control the lighting unit in accordance with the filtered lighting setpoint.

Preferably, the control unit and/or the computing unit may comprise a microcontroller element or a data processor programmed with a suitable computer program in order to carry out said method.

The arrangement of the optical system may preferably be such that the light emitted by the elementary light sources of the lighting unit passes therethrough. The optical system may preferably comprise at least one optical lens.

The data reception unit may preferably comprise a network interface capable of receiving/sending data over a data bus internal to the motor vehicle. For example, the bus may be a CAN (Controller Area Network) bus, an Ethernet bus, a bus of gigabit multimedia serial link, GMSL, type, or a bus using low-voltage differential signaling, LVDS, technology, such as an FPD-Link III bus.

The matrix light source may preferably comprise a monolithic source, comprising elementary light-emitting light sources with semiconductor elements that are etched into a common substrate and are activatable independently of one another.

The matrix light source may preferably comprise a microLED-type matrix, comprising a matrix of elementary sources produced by light-emitting diodes, LEDs, of small size, typically smaller than 150 μm.

The matrix light source may preferably comprise a micromirror device, DMD (digital micromirror device), in which an elementary source comprises a micromirror in a matrix, which selectively reflects an incident light beam according to its position.

According to yet another aspect of the invention, what is proposed is a computer program comprising a sequence of instructions which, when they are executed by a processor, result in the processor implementing a method according to one aspect of the invention.

According to another aspect of the invention, what is proposed is a non-transitory computer-readable storage medium, said medium storing a computer program according to the preceding aspect of the invention.

By using the aspects according to the invention, it becomes possible to pre-emptively anticipate geometric aberrations induced in an image projected by an optical system (such as deformations or blurring). This is achieved using a digital method, preferably implemented by computer software. The solution therefore does not require the use of more expensive optics that would generate fewer deformations. This approach makes it possible to keep the production cost of the proposed lighting device relatively stable while clearly improving its optical behavior. This improvement is all the more useful when the lighting device performs an "adaptive driving beam", or ADB, function, which requires the projection of precise contours and patterns, while requiring a lower brightness.

Other features and advantages of the present invention will be better understood from the description of examples, and from the drawings, in which.

Figure 1:
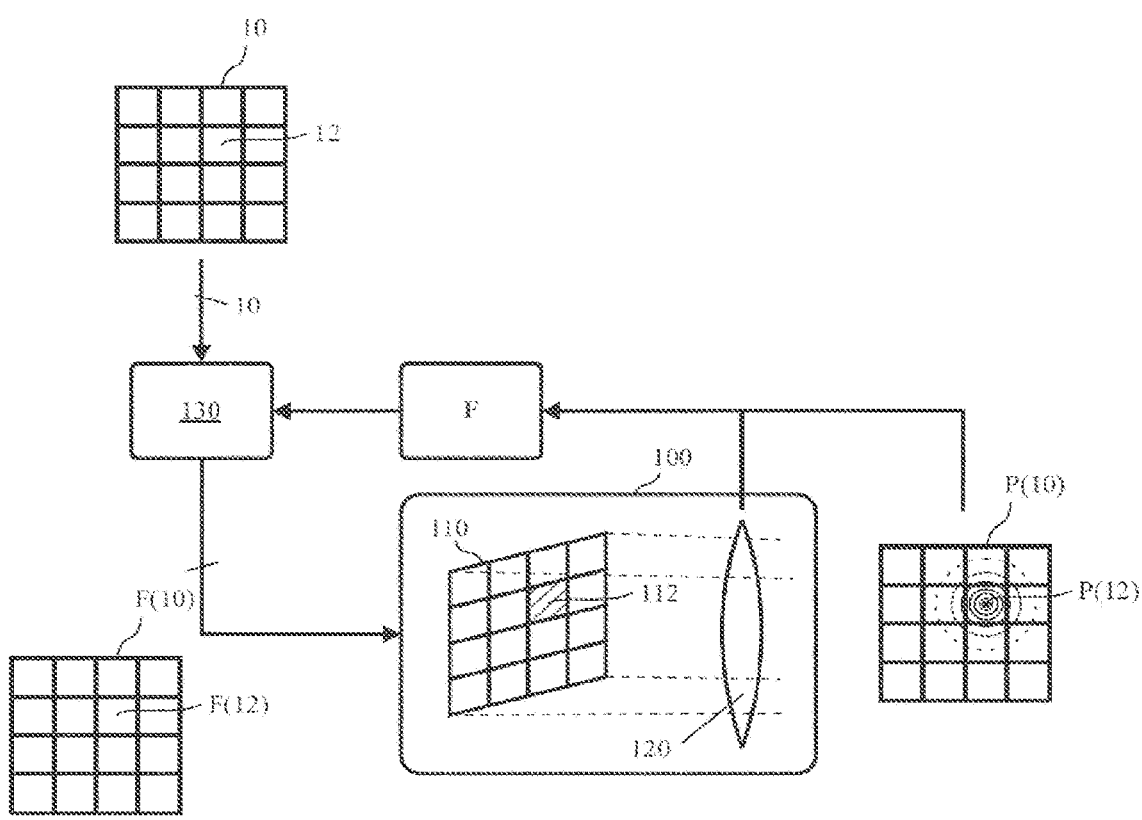
FIG. 1 is an illustration of a method in accordance with one preferred embodiment of the invention.

Unless specified otherwise, technical features that are described in detail for one given embodiment may be combined with the technical features that are described in the context of other embodiments described by way of example and without limitation.

The description focuses on the elements of a lighting module for a motor vehicle that are required to understand the invention. Other elements, which in a known manner form part of such modules, will not be mentioned or described in detail. For example, the presence and operation of a converter circuit involved in supplying electric power to a matrix light source, known per se, will not be described in detail.

A matrix light source may produce a large number of elementary light sources, for example several thousand electroluminescent semiconductor element-based light sources, of LED type. Such a light source may cover a large field of view, of the order of 35°. In a lighting device for a motor vehicle, an optical system comprising at least one optical lens is typically associated with such a matrix light source. Typically, the central portion of a projected image has a high resolution, while the image edge regions have a lower resolution. It has been observed that in a high-definition central region (corresponding to approximately −11° to 11° of aperture), the light emitted by an elementary source produces a projected pixel, and also contributes to the brightness of around two neighboring pixels. The light emitted by an elementary source in an average region (corresponding to approximately +/−11 to 14) produces a projected pixel, and also contributes to the brightness of around four neighboring pixels. In a low-resolution edge region, the light emitted from a single elementary source produces one projected pixel, and at the same time contributes to the brightness of around eight pixels in its neighborhood. The spatial distribution of the light emitted by an elementary source of the matrix light source is therefore not homogeneous for all of the elementary sources that make up the matrix light source, but depends on the location of the elementary source with respect to the optical system, even though the features of the elementary sources are otherwise the same. It has also been observed that the spatial distribution of the light emitted by an elementary light source depends on its operating output: at 100% output (always on), the light produced is liable to contribute to the illumination of a larger number of neighboring pixels than at a lower output. A blurring effect of the projected light beam or geometric aberration effect induced by the optical system may therefore be at least partially counteracted by reducing the light intensity of an elementary light source. The output of a light-emitting-diode light source may, in a known manner, be influenced by driving its electric current supply by way of a pulse-width-modulation, or PWM, signal, which is characterized by a duty cycle representative of the desired output. The invention uses these observations to implement a method that limits optical aberrations generated by the lighting unit.

The illustration of FIG. 1 shows the provision of a digital lighting setpoint 10 intended to be projected by a digital lighting unit 100. The digital setpoint comprises, for example, an image in which each pixel 12 comprises a light intensity value, which should ideally be reproduced by a corresponding elementary light source 112 of a matrix light source 110 of the digital lighting unit 100. The matrix source 110 may comprise a monolithic source, a digital micromirror device, or other matrix light sources known in the art. The digital lighting unit 100 also comprises an optical system comprising at least one optical lens 120, arranged downstream of the matrix light source, following the direction of the emitted light. A computing unit 130, such as a processor or a microcontroller element programmed for this purpose, applies digital filtering F to the original digital setpoint 10, thus producing a filtered digital setpoint F(10). The latter is relayed to the lighting unit and ultimately projected by way of the matrix light source 110 and the optical system. The result is a projected image P(10). The filtering step makes it possible to anticipate geometric aberrations induced by the optical system 120. It should be noted that a projected pixel P(12) corresponds to a spatial distribution of light, having a maximum intensity at the center and a decreasing bell-shaped trend in its neighborhood. The filter F depends on the distribution generated for each elementary light source 112 by the optical system 120.

According to one preferred embodiment of the invention, the value of each pixel 12 of the original setpoint 10 is adapted by the computing unit 130 according to a predetermined reduction factor or value that forms part of the data of the filter F. Each of these elementary setpoint filtering values is chosen so as to limit the impact of the spatial distribution of light emitted for a given pixel P(12) on its neighboring pixels. According to one preferred embodiment, the horizontal behavior of a matrix source is virtually homogeneous. In such a case, one elementary setpoint filtering value is chosen for each column of the original setpoint 10, thus limiting the computing requirements of the computing unit 130.

Figure 2:
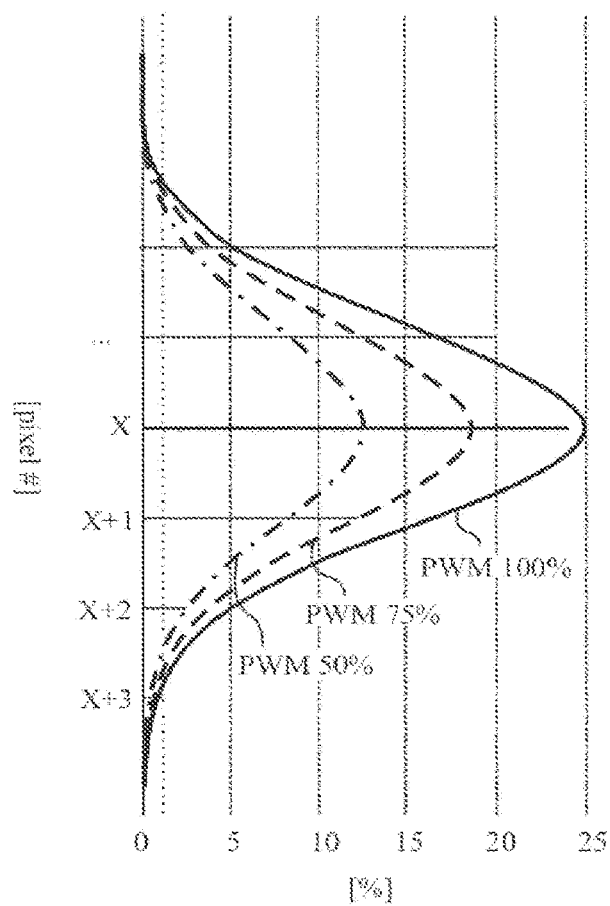
FIG. 2 is an illustration of the spatial light distribution of a pixel projected by a lighting unit in accordance with one preferred embodiment of the invention.

FIG. 2 shows how the elementary setpoint filtering values are obtained according to one preferred embodiment, without the invention however being limited to this example. The vertical axis shows references of pixels or equivalently of sources/columns of elementary light sources. The horizontal axis shows a percentage of brightness with respect to a maximum normalization intensity. Consideration is given here to the pixel of index X. When the light source X operates with a duty cycle of 100%, the area under the curve "PWM 100%" represents all of the emitted light, while the trend of the curve shows the spatial distribution of this emission. The values indicated for the neighboring pixels/columns X+1 (12%), X+2 (4%), X+3 (0%, raised to a minimum of 1%, shown in dotted lines) represent predetermined brightness threshold values that the spatial light distribution of the pixel X has to comply with in order to guarantee a projection with reduced geometric aberrations. These values may be determined either empirically through precise measurements or by computerized simulation methods. They depend on the matrix light source that is used, on the features of the elementary light sources, and also on the optical system that is used.

It becomes apparent that a setpoint equivalent to 100% brightness for the elementary light source of index X involves excessively high brightness levels for all of the neighboring pixels. In order to comply with all of the imposed constraints, an output of 50% should be applied to the pixel of index X, if the original setpoint indicates 100%. The corresponding weight of 0.5 is stored in a memory element as elementary setpoint filtering value for each setpoint of index X. The filtering values may be refined for other intensities of the pixel of index X. This method is carried out once for all of the elementary light sources or for all of the columns of elementary sources. The method produces the filtering values F for the lighting unit in question. It should be noted that the elementary setpoint filtering values are not homogeneous for all of the elementary light sources, since their location with respect to the optical system 120 has a major impact on the light distribution that they produce.

Once all of these weights or elementary setpoint filtering values have been identified, the step of applying the filter is preferably implemented by the following algorithm:

for all the pixels i, j of the original setpoint:

$$\min_{value} = 1;$$
$$\text{for all k in } [-5, \ldots, 5]$$
$$\quad \text{if k} = 0$$
$$\quad\quad \text{value} = I_t(i,j)$$
$$\quad \text{else}$$
$$\quad\quad \text{value} = I_t(i + k, j) * W_C(k)$$
$$\text{if value} < i_{Min}$$
$$\quad \text{value} = i_{Min}$$
$$\text{if value} < \min_{value}$$
$$\quad \min_{value} = \text{value};$$
$$I_p(i + k, j) = \min_{value}$$

In which $I_t$ represents the original setpoint 10, $I_p$ represents the filtered setpoint F(10), $W_c$ is the vector of the filtering weights of column "c", and $i_{min}$ is a lower threshold value that avoids the algorithm ending up setting all the intensities to 0. The value $\min_{value}$ makes it possible to retain the worst case from among all of the neighboring pixels, that is to say the neighboring pixel most impacted by the pixel X. In the example given, for a given pixel, 10 neighboring columns are adapted by the algorithm, since 10 columns are liable to be impacted by the spatial distribution of the light emitted by this given pixel. It goes without saying that these data should be adapted depending on the application along with the features of the light sources/optical systems under consideration, without otherwise departing from the scope of the present invention.

Figure 3:
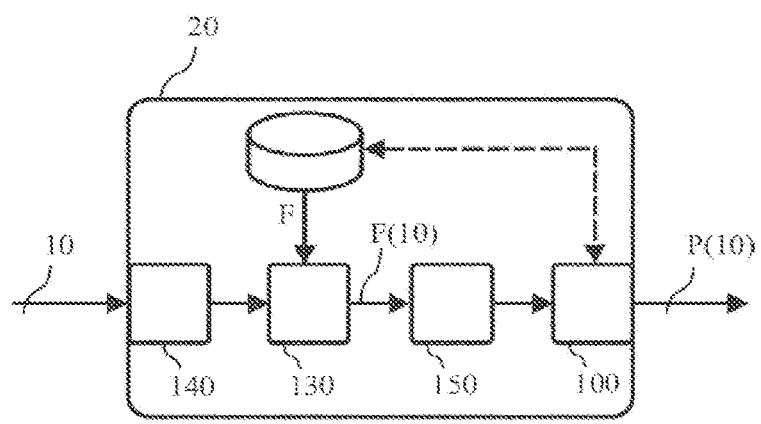
FIG. 3 is a schematic illustration of a lighting device in accordance with one preferred embodiment of the invention.

FIG. 3 schematically shows a lighting device 20 according to one preferred embodiment of the invention. It comprises a digital lighting unit 100 having a matrix light source composed of elementary light sources as well as an optical system. A data reception unit 140 is able to receive a lighting setpoint 10, in the form of a digital image over a data bus of a motor vehicle. Typically, the setpoint comes from a central control module of the vehicle. The device comprises a microcontroller element 130 configured so as to adapt each received lighting setpoint 10 in accordance with the method described above. The device furthermore comprises a control unit 150 intended to control the lighting unit 100 in accordance with the filtered lighting setpoint F(10). To do this, the duty cycle of a pulse-width-modulated control signal is preferably adapted so as to reflect the filtered setpoint values F(10).

It goes without saying that the described embodiments do not limit the scope of protection of the invention. By referring to the description that has just been given, other embodiments may be contemplated without otherwise departing from the scope of the present invention.

The scope of protection is defined by the claims.

The invention claimed is:

1. A method for adapting a digital lighting setpoint projected by a digital lighting unit of a motor vehicle comprising a matrix light source and an optical system, wherein the method comprises applying, by way of a computing unit, digital filtering to the digital lighting setpoint before relaying the filtered digital lighting setpoint to the digital lighting unit, said digital filtering including applying filtering values to the digital lighting setpoint, the filtering values being based on a spatial distribution of light induced by said optical system during projection of the digital lighting setpoint.

2. The method as claimed in claim 1, wherein the digital lighting setpoint comprises an elementary light setpoint for each elementary light source of the matrix light source, and in that the digital filtering comprises selectively reducing the elementary light setpoints in accordance with predetermined elementary setpoint filtering values.

3. The method as claimed in claim 2, wherein said digital filtering comprises applying a dedicated digital filter for each of the elementary light setpoints, said dedicated digital filter including a predetermined elementary setpoint filtering value applied to the elementary light setpoint based on a spatial distribution of light induced by said optical system on projected pixels that form part of a spatial neighborhood of a projected pixel corresponding to said elementary light setpoint.

4. The method as claimed in claim 2, wherein said digital filtering comprises applying a dedicated digital filter for each column or row of elementary light setpoints, said dedicated digital filter including column or row filtering values applied to each column or row of elementary light setpoints based on a spatial distribution of light induced by said optical system on projected columns or rows of pixels that form part of a spatial neighborhood of a projected column or row of pixels corresponding to said column or row of elementary light setpoints.

5. The method as claimed in claim 2, wherein the digital lighting setpoint comprises a digital image having a resolution at least equal to a projection resolution of the digital lighting unit.

6. The method as claimed in claim 2, further comprising, for each elementary light source of the matrix light source:
determining a spatial light distribution of a pixel projected through the optical system when the elementary light source is controlled so as to emit at a maximum output;
determining, by way of a computer, a reduction factor or value of the maximum output, such that areduced emission output produces a spatial light distribution that illuminates pixels in a spatial neighborhood of the projected pixel at most to a predetermined degree of brightness; and
associating the reduction factor or value with a position of said elementary light source in the matrix light source, and storing the reduction factor or value in a memory element as an elementary setpoint filtering value for a corresponding elementary setpoint.

7. The method as claimed in claim 1, wherein said digital filtering comprises applying a dedicated digital filter for each elementary light setpoint of the digital lighting setpoint, said dedicated digital filter including an elementary setpoint filtering value applied to the elementary light setpoint based on a spatial distribution of light induced by said optical system on projected pixels that form part of a spatial neighborhood of a projected pixel (P) corresponding to said elementary light setpoint.

8. The method as claimed in claim 7, wherein the digital lighting setpoint comprises a digital image having a resolution at least equal to a projection resolution of the digital lighting unit.

9. The method as claimed in claim 7, further comprising for each elementary light source of the matrix light source:
determining a spatial light distribution of a pixel projected through the optical system when the elementary light source is controlled so as to emit at a maximum output;
determining, by way of a computer, a reduction factor or value of the maximum output, such that a reduced emission output produces a spatial light distribution that illuminates pixels in the spatial neighborhood of the projected pixel at most to a predetermined degree of brightness; and
associating the reduction factor or value with a position of said elementary light source in the matrix light source, and storing the reduction factor or value in a memory element as an elementary setpoint filtering value for a corresponding elementary setpoint.

10. The method as claimed in claim 1, wherein said digital filtering comprises applying a dedicated digital filter for each column or row of elementary light setpoints of the digital lighting setpoint, said dedicated digital filter including column or row filtering values applied to each column or row of elementary light setpoints based on a spatial distribution of light induced by said optical system on projected columns or rows of pixels that form part of a spatial neighborhood of a projected column or row of pixels corresponding to said column or row of elementary light setpoints.

11. The method as claimed in claim 1, wherein the digital lighting setpoint comprises a digital image having a resolution at least equal to a projection resolution of the digital lighting unit.

12. The method as claimed in claim 1, further comprising for each elementary light source of the matrix light source:
determining a spatial light distribution of a pixel projected through the optical system when the elementary light source is controlled so as to emit at a maximum output;
determining, by way of a computer, a reduction factor or value of the maximum output, such that a reduced emission output produces a spatial light distribution that illuminates pixels in a spatial neighborhood of the projected pixel at most to a predetermined degree of brightness; and
associating the reduction factor or value with a position of said elementary light source in the matrix light source, and storing the reduction factor or value in a memory element as an elementary setpoint filtering value for a corresponding elementary setpoint.

13. The method as claimed in claim 12, wherein the determining the spatial light distribution (P), determining the reduction factor or value, and associating the reduction factor or value are performed once for each row or column of elementary light sources.

14. A lighting device for a motor vehicle, comprising a digital lighting unit having a matrix light source composed of elementary light sources as well as an optical system, the device furthermore comprising a data reception unit intended to receive a digital lighting setpoint, wherein the device comprises a computing unit configured so as to adapt a received digital lighting setpoint by applying digital filtering to the digital lighting setpoint before relaying the filtered digital lighting setpoint to the digital lighting unit, said digital filtering including applying filtering values to the digital lighting setpoint, the filtering values being based on a spatial distribution of light induced by the optical system during projection of the digital lighting setpoint,
the lighting device furthermore comprising a control unit configured to control the digital lighting unit in accordance with the filtered digital lighting setpoint.

15. The lighting device for a motor vehicle as claimed in claim 14, wherein the digital lighting setpoint comprises an elementary light setpoint for each of the elementary light sources of the matrix light source, and the digital filtering comprises selectively reducing the elementary light setpoints in accordance with predetermined elementary setpoint filtering values.

16. The lighting device for a motor vehicle as claimed in claim 14, wherien the digital filtering includes applying a dedicated digital filter for an elementary light setpoint of each of the elementary light sources based on a spatial distribution of light induced by the optical system on projected pixels that form part of a spatial neighborhood of a projected pixel corresponding to said elementary light setpoint.

17. A non-transitory computer-readable storage medium, said medium storing a computer program, the computer program comprising a sequence of instructions which, when executed by a processor, result in the processor implementing a method comprising:

applying digital filtering to a digital lighting setpoint projected by a digital lighting unit before relaying the filtered digital lighting setpoint to the digital lighting unit, said digital filtering including applying filtering values to the digital lighting setpoint, the filtering values being based on a spatial distribution of light induced by an optical system during projection of the digital lighting setpoint.

18. The non-transitory computer-readable storage medium storing said computer program as claimed in claim 17, wherein the digital lighting setpoint comprises an elementary light intensity setpoint for each elementary light source of a matrix light source and the digital filtering comprises selectively reducing the elementary light setpoints in accordance with predetermined elementary setpoint filtering values.

19. The non-transitory computer-readable storage medium storing said computer program as claimed in claim 17, wherein the digital filtering includes applying a dedicated digital filter for each elementary light setpoint of a matrix light source, the dedicated digital filter including an elementsary setpoint filtering value applied to the elementary light setpoint based on a spatial distribution of light induced by the optical system on projected pixels that form part of a spatial neighborhood of a projected pixel corresponding to said elementary light setpoint.

\* \* \* \* \*